(12) United States Patent
Franks

(10) Patent No.: US 7,793,895 B2
(45) Date of Patent: Sep. 14, 2010

(54) CABLE TIE FOR AN AUTOMOTIVE VALVE COVER

(75) Inventor: John R. Franks, Hopkinton, MA (US)

(73) Assignee: Avery Dennison Corporation, Pasadena, CA (US)

( * ) Notice: Subject to any disclaimer, the term of this patent is extended or adjusted under 35 U.S.C. 154(b) by 207 days.

(21) Appl. No.: 11/818,222

(22) Filed: Jun. 13, 2007

(65) Prior Publication Data

US 2008/0001040 A1    Jan. 3, 2008

Related U.S. Application Data

(60) Provisional application No. 60/813,281, filed on Jun. 13, 2006.

(51) Int. Cl.
*F16L 3/08*    (2006.01)
(52) U.S. Cl. .................. 248/74.3; 248/71; 24/16 PB; 24/17 AP; 411/508
(58) Field of Classification Search ............. 248/74.3, 248/71, 68.1, 67.5, 65, 74.5, 73; 24/16 PB, 24/17 AP; 411/508, 509, 510, 913
See application file for complete search history.

(56) References Cited

U.S. PATENT DOCUMENTS

| | | | |
|---|---|---|---|
| 4,865,281 A | 9/1989 | Wollar | |
| 4,899,963 A | 2/1990 | Murphy | |
| 4,943,183 A | 7/1990 | Nakano | |
| 4,989,822 A | 2/1991 | Fannon | |
| 4,993,669 A | 2/1991 | Dyer | |
| 5,040,752 A | 8/1991 | Morrison | |
| 5,131,613 A | 7/1992 | Kamiya et al. | |
| 5,169,100 A | 12/1992 | Milcent et al. | |
| 5,209,441 A | 5/1993 | Satoh | |
| 5,306,098 A * | 4/1994 | Lewis | 411/510 |
| 5,316,245 A | 5/1994 | Ruckwardt | |
| 5,333,822 A | 8/1994 | Benoit et al. | |
| 5,337,983 A | 8/1994 | Mailey | |
| 5,362,018 A | 11/1994 | Darr et al. | |
| 5,367,750 A * | 11/1994 | Ward | 24/16 PB |
| 5,368,261 A | 11/1994 | Caveney et al. | |
| 5,385,321 A | 1/1995 | Kume et al. | |
| 5,386,615 A | 2/1995 | Bernard | |
| 5,495,645 A | 3/1996 | Suzuki et al. | |
| 5,505,411 A | 4/1996 | Heaton et al. | |
| 5,636,937 A | 6/1997 | Zemlicka | |

(Continued)

*Primary Examiner*—J. Allen Shriver
*Assistant Examiner*—Todd M. Epps
(74) *Attorney, Agent, or Firm*—Kriegsman & Kriegsman

(57) ABSTRACT

A cable tie includes a locking head and an attached strap, the locking head being adapted to receive and engage the strap when the tie is formed into a closed loop. The cable tie additionally includes a fir-tree fastener connected to the locking head by an elongated standoff that includes a stem and an enlarged member which separates the stem into first and second sections. In use, a plurality of wires bundled together by the tie can be secured to an automotive valve cover by inserting the fastener and the first section of the stem through a corresponding bore formed in the valve cover. With tie inserted as such, the second section of the stem serves to space the bundled wires away from the valve cover, with the first section of the stem and the enlarged member together serving to stabilize the tie within the bore of the valve cover.

15 Claims, 5 Drawing Sheets

U.S. PATENT DOCUMENTS

| | | | |
|---|---|---|---|
| 5,653,410 A | 8/1997 | Stroeters et al. | |
| 5,799,906 A | 9/1998 | Hillegonds | |
| 5,803,413 A * | 9/1998 | Benoit et al. | 248/73 |
| 5,803,414 A | 9/1998 | Wright | |
| 5,816,543 A | 10/1998 | Kraus | |
| 5,906,342 A | 5/1999 | Kraus | |
| 5,921,510 A * | 7/1999 | Benoit et al. | 248/71 |
| 6,039,523 A * | 3/2000 | Kraus | 411/48 |
| 6,076,781 A | 6/2000 | Kraus | |
| 6,128,809 A | 10/2000 | Khokhar | |
| 6,196,751 B1 | 3/2001 | Khokhar | |
| 6,257,530 B1 | 7/2001 | Tsai | |
| 6,273,656 B1 | 8/2001 | Cleland et al. | |
| 6,511,030 B1 | 1/2003 | Kelley | |
| 6,513,767 B1 | 2/2003 | Rodgers | |
| 6,533,226 B2 | 3/2003 | Geiger | |
| 6,636,679 B1 | 10/2003 | Mereness | |
| 6,641,093 B2 | 11/2003 | Coudrais | |
| 6,718,597 B2 | 4/2004 | Geiger | |
| 6,719,513 B1 * | 4/2004 | Moutousis et al. | 411/510 |
| 6,749,157 B2 * | 6/2004 | Takeuchi | 248/71 |
| 6,763,172 B2 | 7/2004 | Sahlin et al. | |
| 6,804,864 B2 * | 10/2004 | Kirchen et al. | 24/297 |
| 6,905,098 B2 | 6/2005 | Tisol, Jr. | |
| 7,229,052 B2 * | 6/2007 | Takeuchi | 248/71 |
| 7,316,375 B2 * | 1/2008 | Wakabayashi et al. | 248/71 |
| 7,661,633 B2 * | 2/2010 | Igarashi et al. | 248/74.3 |

* cited by examiner

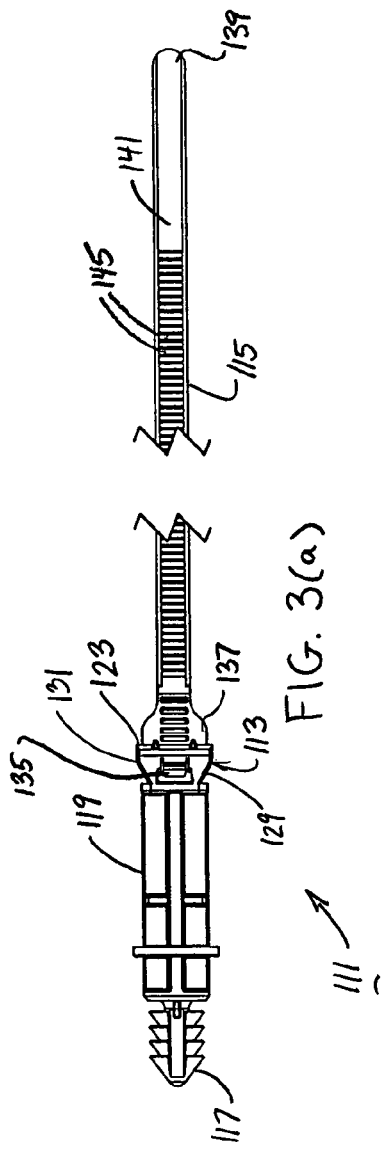
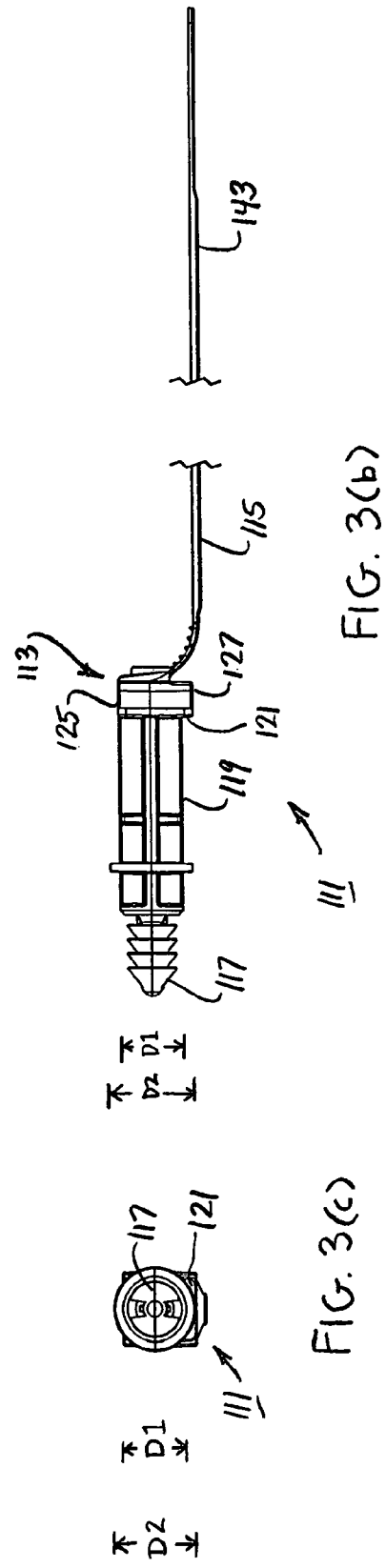
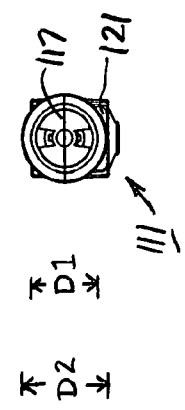
FIG. 3(a)
FIG. 3(b)
FIG. 3(c)

CABLE TIE FOR AN AUTOMOTIVE VALVE COVER

CROSS-REFERENCE TO RELATED APPLICATIONS

The present application claims the benefit under 35 U.S.C. 119(e) of U.S. provisional Patent Application Ser. No. 60/813,281, filed on Jun. 13, 2006, the disclosure of which is incorporated herein by reference.

BACKGROUND OF THE INVENTION

The present invention relates generally to cable ties and more particularly to cable ties that are designed for use in automotive applications.

Cable ties are well-known in the art and are commonly used in commerce to bundle together of a plurality of objects, such as a group of parallel wires. One type of cable tie which is well known in the art comprises a serrated strap which is fitted to an apertured head. In use, the cable tie can be formed into closed loop by inserting the serrated strap through the apertured head. With the serrated strap inserted through the apertured head, an internal pawl, or locking tang, disposed within the apertured head lockably engages the serrations of the strap to prevent the strap from being backed out of the apertured head. In this manner, the engagement of the internal pawl onto the serrated strap secures the cable tie in its closed loop configuration.

In certain applications, it is desirable to retain a group of wires bundled with a cable tie securely against a flat surface. In particular, in the automotive industry it is often desirable to retain a group of electrical wires bundled with a cable tie securely against an automotive panel so as to preclude the bundle from moving (i.e., rattling) within the automobile body during operation of the vehicle. Accordingly, cable ties are commonly provided with an insert fastener which can be coupled to an automotive panel. Insert fasteners are commonly constructed in a variety of different configurations. One well-known type of insert fastener which is commonly formed onto the free end of a conventional cable tie is a Christmas-tree fastener (also commonly referred to in the art as a pine-tree fastener or a fir-tree fastener). Examples of cable ties which are provided with a Christmas-tree type fastener are described in U.S. Pat. No. 5,921,510 to J. C. Benoit et al. and U.S. Pat. No. 4,342,438 to R. Speedie, both of said references being incorporated herein by reference.

A more specific need has arisen in the automotive industry to retain a group of electrical wires bundled with a cable tie securely against an automotive valve cover Referring now to FIG. 1, there is shown a top perspective view of an automotive valve cover 11 that is preferably constructed as a unitary member using glass-reinforced plastic. Valve cover 11 comprises a substantially flat top panel 13 and a four-sided sidewall 15 that extends down from the periphery of top panel 13 so as to provide valve cover 11 with a generally U-shaped configuration in lateral cross-section. An outwardly extending flange 17 is formed onto the free end of sidewall 15 and is shaped to define a plurality of spaced apart holes 19 that extend transversely therethrough. In use, a plurality of fastening elements (not shown), such as bolts, are disposed through holes 19 and are driven into an automotive panel (not shown) in order to secure valve cover 11 to the panel.

Valve cover 11 additionally includes a plurality of outwardly extending tabs 21 that are formed on flange 17 in a spaced apart relationship relative to one another. Referring now to FIGS. 2(a)-(c), each tab 21 is shaped to define a longitudinally extending bore 23 which is generally circular in lateral cross-section. As seen most clearly in FIG. 2(c), each bore 23 has a uniform cross-sectional diameter of approximately 0.39±0.1 inches with the notable exception of an inwardly protruding, annular shelf 25 which is provided at the approximate midpoint of bore 23 and which reduces the cross-sectional diameter of bore 23 to approximately 0.25±0.1 inches. In this manner, shelf 25 provides bore 23 with a countersunk appearance at its top and bottom ends.

As can be appreciated, tabs 21 are provided as means to secure a group of electrical wires bundled with a cable tie against valve cover 11. Specifically, an insert fastener formed on the cable tie is disposed through the bore 23 and into engagement with shelf 25 to secure the bundle of wires against valve cover 11. In this manner, the bundle of wires are precluded from bouncing, rattling or otherwise moving within the automotive body during operation of the car.

It has been found that the above-described process for securing a plurality of electrical wires against valve cover 11 suffers from a notable drawback. Specifically, the rubbing generated from the contact of the electrical wires against valve cover 11 can cause insulation for the wires to chafe. Because valve cover 11 typically rises in temperature during operation of the automobile, this wearing away of insulation for the electrical wires can create a potentially hazardous electrical condition.

SUMMARY OF THE INVENTION

It is an object of the present invention to provide a new and improved one-piece cable tie which includes a serrated strap fitted to an apertured head.

It is another object of the present invention to provide a cable tie of the type as described above which can be formed into a closed loop to bundle together a plurality of objects, such as a group of parallel wires.

It is yet another object of the present invention to provide a cable tie of the type as described above which further includes a fastener that is designed for insertion through a bore formed in an automotive valve cover.

It is still another object of the present invention to provide a cable tie of the type as described above which adequately spaces the plurality of bundled objects away from the automotive valve cover when coupled thereto.

It is yet still another object of the present invention to provide a cable tie of the type as described above which includes a limited number of parts, which is easy to use and which is inexpensive to manufacture.

Accordingly, there is provided a cable tie cable tie adapted to be coupled to an automotive valve cover, said cable tie comprising (a) a head shaped to define a strap accepting channel, the head comprising a locking member which is disposed to project into the strap accepting channel, (b) a strap formed onto the head, the strap being sized and shaped to be both inserted into the strap accepting channel and engaged by the locking member, (c) an elongated standoff comprising (i) a stem having a first end and a second end, the first end of the stem being formed onto the head, and (ii) an enlarged member formed onto the stem at a location between the first end and the second end, and (d) a fastener formed onto the second end of the stem.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate an embodiment of the present invention and, together with the description, serve to explain the principles of the invention. In the drawings, wherein like reference numerals represent like parts:

FIG. 3(a) is a fragmentary front plan view of a cable tie constructed according to the teachings of the present invention, the cable tie including a fastener designed for connection with the automotive valve cover shown in FIG. 1;

FIG. 3(b) is a fragmentary left side view of the cable tie shown in FIG. 3(a);

FIG. 3(c) is a top plan view of the cable tie shown in FIG. 3(b);

DETAILED DESCRIPTION OF A PREFERRED EMBODIMENT

Figure 1:
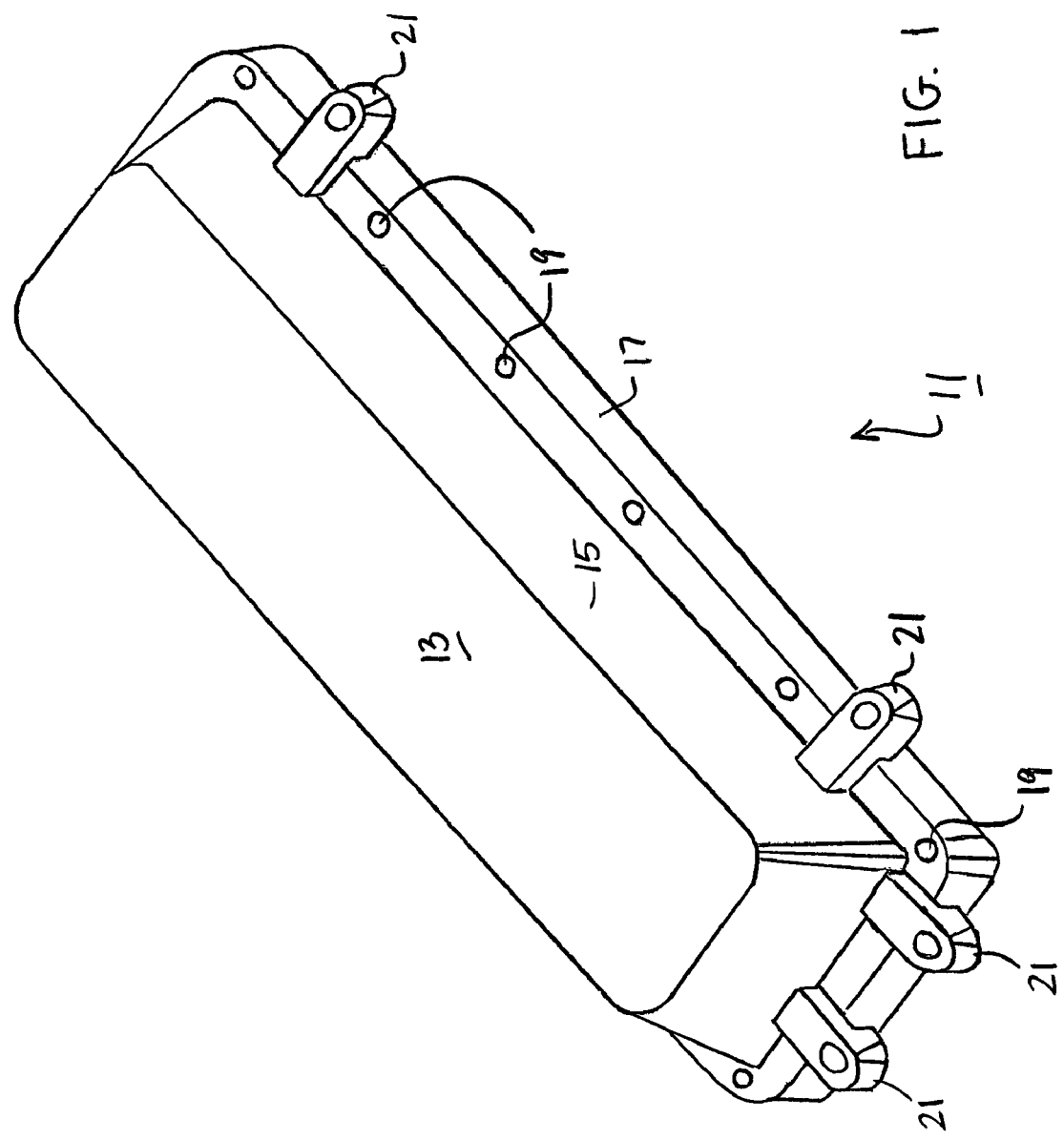
FIG. 1 is a top perspective view of an automotive valve cover.
Figure 2A:
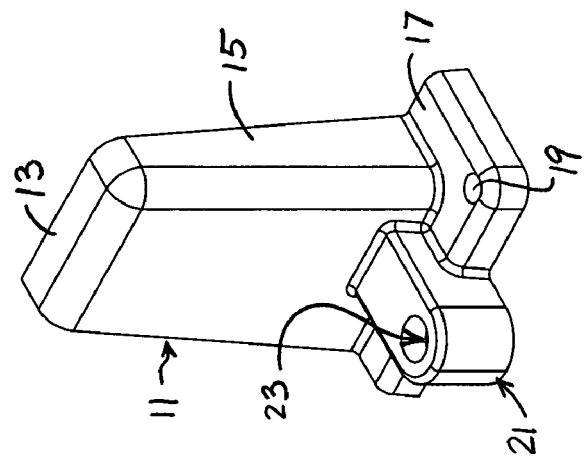
FIG. 2(a) is a fragmentary perspective view the automotive valve cover shown in FIG. 1.
Figure 2B:
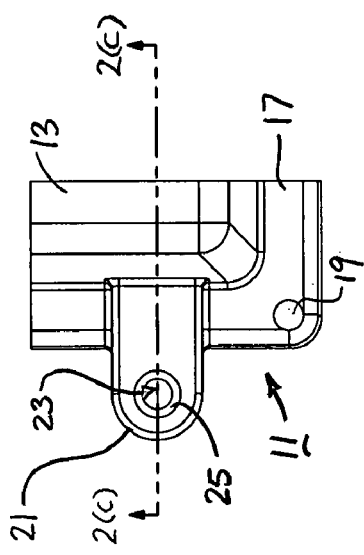
FIG. 2(b) is a top plan view of the automotive valve cover shown in FIG. 2(a)
Figure 2C:
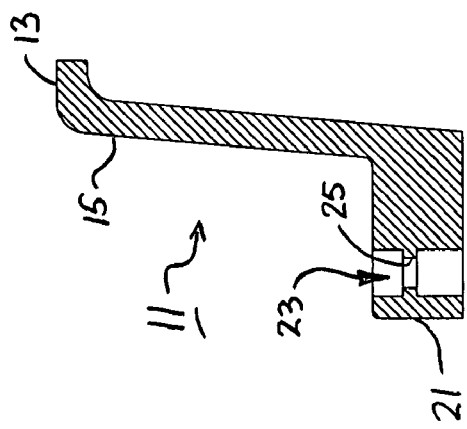
FIG. 2(c) is a section view of the automotive valve cover shown in FIG. 2(b) taken along lines 2(c)-2(c)

Referring now to FIGS. 3(a), 3(b), 3(c) and 4, there is shown a cable tie (also referred to herein simply as a tie) which is constructed according to the teachings of the present invention, the tie being identified generally as reference numeral 111. As will be described further in detail below, tie 111 can be used to both (i) bundle a plurality of objects, such as electrical wires, and (ii) secure said bundle to an automotive valve cover in a spaced apart relationship relative thereto in order to prevent damage to the plurality of bundled objects, which is a principal object of the present invention.

For purposes of simplicity only, cable tie 111 will be described herein as being secured to automotive valve cover 11. However, it is to be understood that cable tie 111 is not limited to use in connection with automotive valve cover 11. Rather, it is to be understood that cable tie 111 could be used to secure a bundle of objects to other items (e.g., alternate designs of valve covers) without departing from the spirit of the present invention.

Cable tie 111 is a unitary member that is preferably constructed of a plastic material, such as nylon, using conventional molding techniques. As can be seen, cable tie 111 includes a locking head 113 and an attached strap 115. In addition, the cable tie 111 includes a fir-tree type fastener 117 that is integrally connected to head 113 by an elongated standoff 119, as will be described in greater detail below.

Locking head 113 is generally rectangular in shape and comprises a top wall 121, a bottom wall 123, a front wall 125, a rear wall 127, a first side wall 129 and a second side wall 131. Together, top wall 121, bottom wall 123, front wall 125, rear wall 127, first side wall 129 and second side wall 131 define a strap accepting channel 133 which extends longitudinally through head 113 (i.e., from front wall 125 to rear wall 127).

Locking head 113 is shaped to include a pivotable locking pawl, or tang, 135 which projects into strap accepting channel 133. As can be appreciated, with strap 115 inserted into channel 133, locking pawl 135 is designed to engage strap 115 to secure tie 111 in its closed loop configuration.

Strap 115 is an elongated flexible member which is generally uniform and rectangular in lateral cross-section. However, it is to be understood that strap 115 could be constructed in alternative sizes and shapes without departing from the spirit of the present invention.

Strap 115 comprises a first end 137, a second end 139, a front surface 141 and a rear surface 143. First end 137 of strap 115 is integrally connected to bottom wall 123 of head 113 so as to render tie 111 a unitary device. Strap 115 further includes a plurality of ratchet-shaped teeth 145 formed along the length of front surface 141, teeth 145 being adapted to be engaged by locking pawl 135 when tie 111 is formed into a closed loop.

Fastener 117 is represented herein as being in the form of a one-piece fir tree type fastener which is integrally connected to top wall 121 of locking head 113 by standoff 119. Fastener 117 (also referred to herein as Christmas-tree fastener 117, pine tree fastener 117 or fir tree fastener 117) is sized and shaped to engage shelf 25 when inserted into bore 23 in valve cover 11, as will be described further in detail below.

It should be noted that cable tie 111 is not limited to the particular design of fastener 117. Rather it is to be understood that alternative forms of insert fasteners (e.g., arrow-head type fasteners) could be used in place of fastener 117 without departing from the spirit of the present invention.

As noted briefly above, standoff 119 (also referred to herein as offset 119) connects fastener 117 to top wall 121 of locking head 113 so as to render tie 111 a unitary device. In this manner, standoff 119 serves to space a plurality of objects that is bundled by tie 111 substantially away from automotive valve cover 11 in which fastener 117 is inserted. Accordingly, it is to be understood that the inclusion and particular design of standoff 119 serves as the principal novel feature of the present invention.

Figure 4:
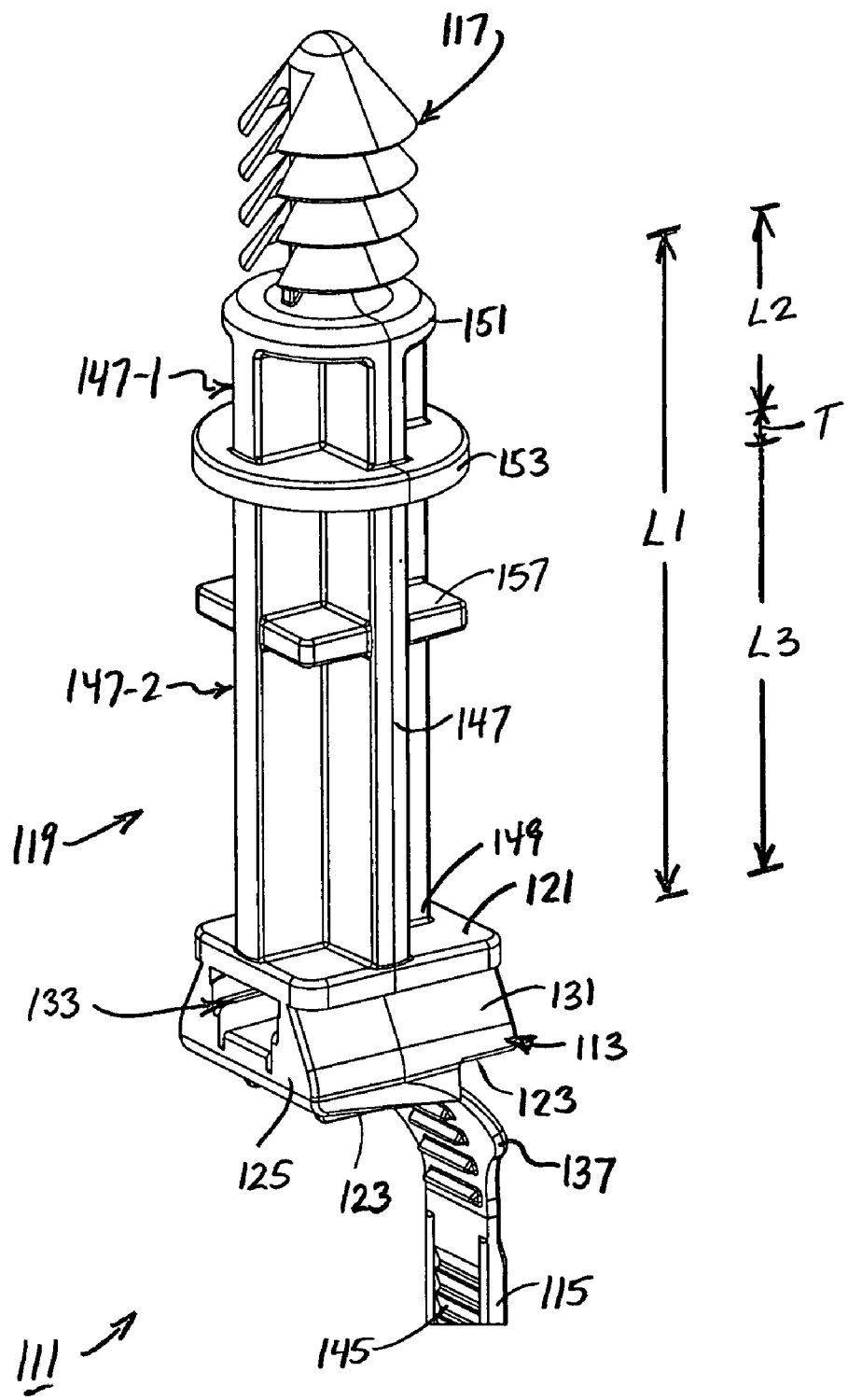
FIG. 4 is an enlarged, fragmentary perspective view of the cable tie shown in FIG. 3(a)

As seen most clearly in FIG. 4, standoff 119 comprises an elongated stem 147 that includes a first end 149 and a second end 151. First end 149 of stem 147 is integrally formed onto top wall 121 of locking head 113, the longitudinal axis of stem 147 extending away from top wall 121 at an approximate right angle relative thereto. Second end 151 of stem 147 is disc-shaped in nature and serves as the surface on which fastener 117 is mounted, the longitudinal axis of fastener 117 extending in coaxial alignment with the longitudinal axis of stem 147.

Stem 147 is generally X-shaped in lateral cross-section and has an overall length $L_1$ of approximately $1.18 \pm 0.1$ inches and a maximum cross-sectional diameter $D_1$ of $0.38 \pm 0.1$ inches. However, it is to be understood that stem 147 is not limited to an X-shaped cross-section. Rather, the cross-section of stem 147 could be modified without departing from the spirit of the present invention.

An enlarged member 153 is integrally formed onto stem 147 at a location between first and second ends 149 and 151. Enlarged member 153 is represented herein as being in the form of disc-shaped member with a diameter D2 of approximately 0.50±0.1 inches and a thickness T of approximately 0.05±0.1 inches. It is important to note that the diameter D2 of enlarged member 153 is greater than the maximum diameter D1 of stem 147 proximate second end 151. As a result, it is to be understood that with tie 111 attached to valve cover 11, enlarged member 153 is designed to abut against tab 21 and thereby provide support, which is highly desirable.

It should be noted that enlarged member 153 is not limited to a disc-shaped configuration. Rather, it is to be understood that enlarged member 153 could be constructed in alternative configurations without departing from the spirit of the present invention. In particular, it is to be understood that enlarged member 153 could be formed into any shape with dimensions that renders it incapable of insertion into bore 23 in valve cover 11.

Enlarged member 153 serves to separate stem 147 into a shortened first section 147-1 which has a length L2 of approximately 0.26±0.1 inches and a longer second section 147-2 which has a length L3 of approximately 0.87±0.1 inches. As will be described in detail below, each of sections 147-1 and 147-2 has a particular function when tie 111 is connected to valve cover 11.

A horizontally disposed, square-shaped, flattened platform, or rib, 157 is formed onto stem 147 along longer second section 147-2. As can be appreciated, platform 157 is provided to facilitate the process of molding tie 111.

In use, cable tie 111 can used in the following manner to bundle together a plurality of objects, such as wires, and in turn secure said bundle to valve cover 11 in the following manner. Specifically, with the plurality of wires grouped together, strap 115 is wrapped around the bundle. The second end of strap 115 is then inserted through strap accepting channel 133 in locking head 113 so as to form a closed loop around the bundle. With cable tie 111 formed into a closed loop, the second end of strap 115 is further advanced through locking head 113 to cinch the cable tie strap 115 tightly around the bundle. Having cinched strap 115 tightly around the bundle, internal pawl 135 lockably engages a serration 145 on strap 115 to prevent strap 115 from being backed out of apertured head 113. In this manner, the engagement of internal pawl 135 onto the serrated strap 115 secures cable tie 111 in its closed loop configuration around the desired bundle.

Figure 5:
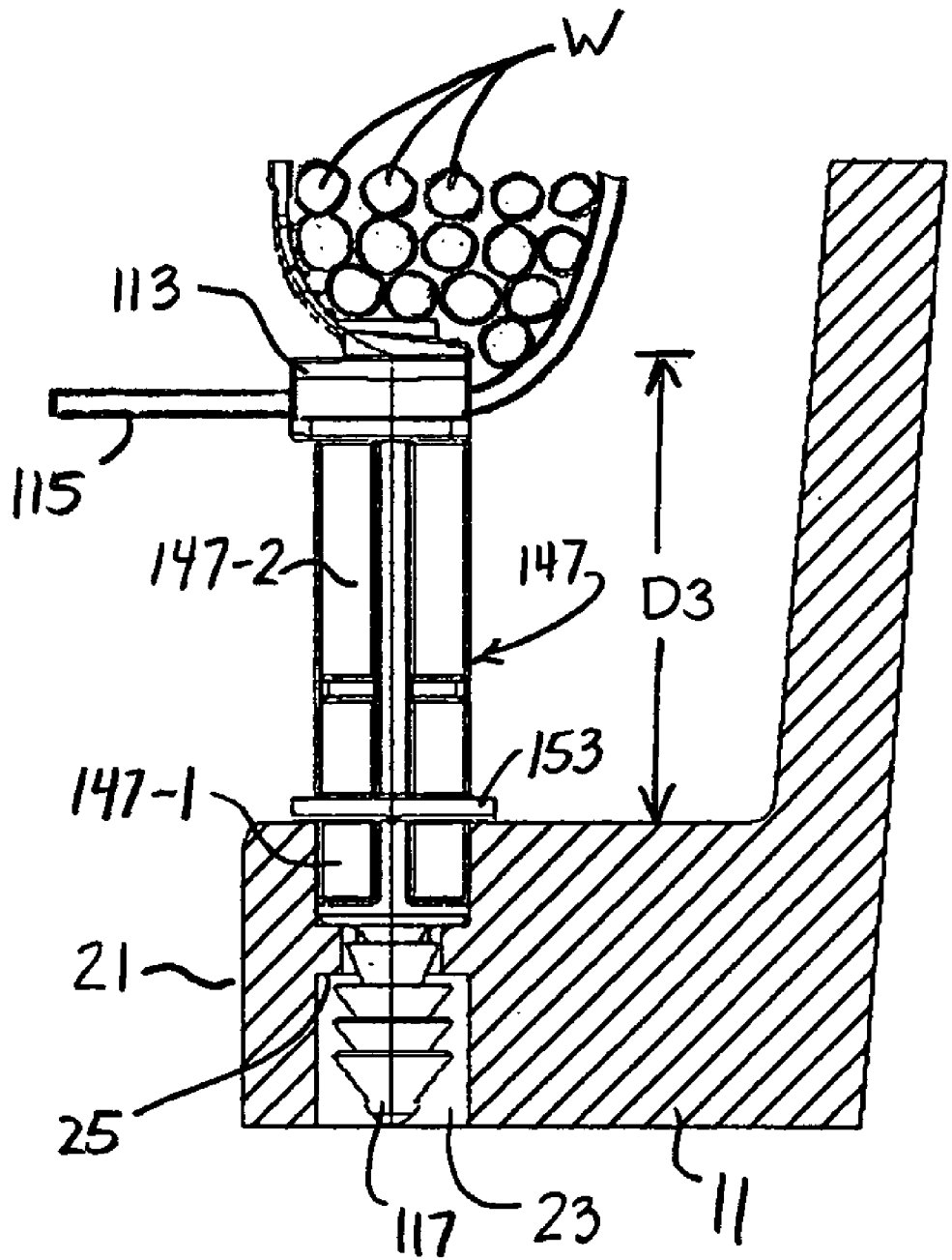
FIG. 5 is an enlarged, fragmentary front plan view of the cable tie shown in FIG. 3(a), the cable tie being shown wrapped around a plurality of objects and inserted into the valve cover shown in FIG. 2(c).

Referring now to FIG. 5, with cable tie 111 formed into a secure loop in order to bundle together a plurality of objects W, fastener 117 is inserted down through bore 23 in valve cover 11 until enlarged member 153 contacts the top surface of tab 21, thereby limiting further insertion. With enlarged member 153 disposed against tab 21, one set of outwardly extending flutes on fastener 117 is disposed directly beneath the underside of shelf 25 and, as such, serve to preclude withdrawal of fastener 117 from valve cover 11. In this manner, cable tie 111 is lockably retained within bore 23.

It should be noted that shortened section 147-1 of standoff 147 is preferably dimensioned to project within bore 23 in a fitting manner. Furthermore, as noted briefly above, enlarged member 153 is dimensioned so as to lie flush against the top surface of tab 21. As a result, together shortened section 147-1 and enlarged member 153 serve the important function of stabilizing fastener 117 within bore 23 (i.e., preventing standoff 147 from rocking, wobbling or otherwise moving within bore 23), which is highly desirable.

With fastener 117 held locked in place within bore 23, it is to be understood that section 147-2 of standoff 147 serves to space the plurality of wires W bundled by tie 111 adequately away from valve cover 11. Specifically, together section 147-2 and locking head 113 serve to space the plurality of wires W bundled by tie 111 away from the top surface of the tab 21 into which fastener 117 is inserted a distance D of approximately 1.22±0.1 inches. As can be appreciated, spacing wires W away from valve cover 11 in this manner serves to prevent wires W from rubbing against valve cover 11, which is a principal object of the present invention.

Because section 147-2 of standoff 147 is not inserted into bore 23, it is to be understood that the dimensions of section 147-2 could be modified without departing from the spirit of the present invention. For example, tie 111 could be constructed such that the diameter of section 147-2 is greater than the diameter of section 147-1. In this manner, section 147-2 would be rendered more rigid and stable, which is highly desirable.

The embodiment of the present invention described above is intended to be merely exemplary and those skilled in the art shall be able to make numerous variations and modifications to them without departing from the spirit of the present invention. All such variations and modifications are intended to be within the scope of the present invention as defined in the appended claims.

What is claimed is:

1. A cable tie adapted to be coupled to an automotive valve cover, said cable tie comprising:
    (a) a head comprising a top wall, a bottom wall, a front wall, a rear wall, a first sidewall and a second sidewall, the head being shaped to define a strap accepting channel, the head further comprising a locking member which is disposed to project into the strap accepting channel;
    (b) a strap formed onto the bottom wall of the head, the strap being sized and shaped to be both inserted into the strap accepting channel and engaged by the locking member;
    (c) an elongated standoff comprising,
        (i) a stem having a first end, a second end and an intermediate portion extending between the first end and the second end, the intermediate portion being uniform in transverse cross-section along its length, the first end of the stem being formed onto the top wall of the head, and
        (ii) an enlarged member formed onto the stem at a location between the first end and the second end; and
    (d) a fastener formed onto the second end of the stem.

2. The cable tie of claim 1 wherein the enlarged member serves to separate the stem into a first section and a second section, the first section of the stem being located between the enlarged member and the fastener and the second section of the stem being located between the enlarged member and the head.

3. The cable tie of claim 2 wherein the overall length of stem is approximately 1.18±0.1 inches.

4. The cable tie of claim 3 wherein the first section of the stem has a length of approximately 0.26±0.1 inches.

5. The cable tie of claim 4 wherein the second section of the stem has a length of approximately 0.87±0.1 inches.

6. The cable tie of claim 2 wherein the enlarged member is larger in lateral cross-section than the first section of the stem.

7. The cable tie of claim 6 wherein the enlarged member is generally disc-shaped.

8. The cable tie of claim 7 wherein the enlarged member has a thickness of approximately 0.05±0.1 inches.

9. The cable tie of claim 7 wherein the diameter of the enlarged member is greater than the maximum cross-sectional diameter of the first section of the stem.

10. The cable tie of claim 9 wherein the enlarged member has a diameter of approximately 0.50±0.1 inches.

11. The cable tie of claim 10 wherein the first section of the stem has a maximum cross-sectional diameter of approximately 0.38±0.1 inches.

12. The cable tie of claim 2 wherein the fastener is formed onto the second end of the stem in axial alignment therewith.

13. The cable tie of claim 2 wherein the stem is generally X-shaped in lateral cross-section.

14. The cable tie of claim 1 wherein the second end of the stem is in the form of a disc-shaped surface on which the fastener is mounted.

15. The cable tie of claim 2 wherein the second section of the stem has a different shape in transverse cross-section than the top wall of the head.

* * * * *